(12) United States Patent
Lee et al.

(10) Patent No.: US 8,717,956 B2
(45) Date of Patent: May 6, 2014

(54) ADAPTIVE POWER-SAVING/POWER-SAVING SUPPORT METHOD IN WIRELESS COMMUNICATION SYSTEM AND APPARATUS USING THE SAME

(75) Inventors: Je-Hun Lee, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 702 days.

(21) Appl. No.: 12/970,630

(22) Filed: Dec. 16, 2010

(65) Prior Publication Data

US 2011/0149820 A1 Jun. 23, 2011

(30) Foreign Application Priority Data

Dec. 18, 2009 (KR) .......................... 10-2009-0127372
Dec. 15, 2010 (KR) .......................... 10-2010-0128205

(51) Int. Cl.
*G08C 17/00* (2006.01)
*H04B 7/185* (2006.01)
*H04J 3/16* (2006.01)
*H04B 1/04* (2006.01)
*H04B 1/16* (2006.01)
*H04B 7/00* (2006.01)

(52) U.S. Cl.
USPC .............................. 370/311; 370/318; 370/465

(58) Field of Classification Search
None
See application file for complete search history.

(56) References Cited

U.S. PATENT DOCUMENTS

| 2005/0170868 A1* | 8/2005 | Fischer | 455/574 |
| 2006/0252449 A1* | 11/2006 | Ramesh | 455/522 |
| 2007/0237104 A1* | 10/2007 | Alon et al. | 370/311 |
| 2009/0122768 A1* | 5/2009 | Nakashima et al. | 370/338 |

OTHER PUBLICATIONS

Shuvo Chatterjee et al., "Exploring Adaptive Power Saving Schemes for Mobile VoIP Devices in IEEE 802.11 Networks", Second International Conference on Digital Telecommunications, 2007, IEEE.

\* cited by examiner

*Primary Examiner* — Chirag Shah
*Assistant Examiner* — Srinivasa Reddivalam (57) ABSTRACT

A method for adaptively performing power saving in a station of a wireless communication system includes: receiving first power-save capability information from an AP, the first power-save capability information containing information on power-save schemes supported by a MAC layer of the AP; transmitting second power-save capability information to the AP in response to the first power-save capability information, the second power-save capability information containing information on power-save schemes supported by a MAC layer of the station; transmitting power-save policy information, into which properties of traffics used in the station are reflected, to the AP; and performing a power-save function while interworking with the MAC layer of the station, according to the power-save policy information based on a predetermined power-save scheme.

20 Claims, 2 Drawing Sheets

ADAPTIVE POWER-SAVING/POWER-SAVING SUPPORT METHOD IN WIRELESS COMMUNICATION SYSTEM AND APPARATUS USING THE SAME

CROSS-REFERENCES TO RELATED APPLICATIONS

The present application claims priority of Korean Patent Application Nos. 10-2009-0127372 and 10-2010-0128205, filed on Dec. 18, 2009, and on Dec. 15, 2010, respectively, which are incorporated herein by reference in their entirety.

BACKGROUND OF THE INVENTION

1. Field of the Invention

Exemplary embodiments of the present invention relate to an adaptive power-saving/power-saving support method in a wireless communication system and an apparatus using the same.

2. Description of Related Art

In the IEEE 802.11 wireless LAN system, one access point (AP) communicates with one or more stations. When a station enters a power-save mode, the AP stores a packet to be transmitted to the station, and transmits the stored packet when the corresponding station can receive the packet. As such, a variety of power-save schemes defined in the IEEE 802.11, 802.11e, and 802.11n are focused on more efficiently transferring a packet which is stored in the AP and then transmitted to the station. As the variety of power-save schemes have been proposed, another power-save scheme may be added in the future. On the other hand, a power-saving support method in the AP and the implementation thereof are described as methods other than the standards.

Therefore, it is not easy to effectively utilize the power-save scheme which may be additionally discussed in a compatible system in the future, depending on the implementation state of numerous stations and APs.

Furthermore, there is no method capable of effectively supporting traffics having different properties, which occur due to the variable conditions of stations and a variety of station-side services. Furthermore, there is no method in which the AP side can effectively support power saving in consideration of the station-side conditions.

SUMMARY OF THE INVENTION

An embodiment of the present invention is directed to an adaptive power-saving/power-saving support method, in which a variety of power-save schemes are effectively utilized in a wireless communication system and the situations of an AP and stations are reflected.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for adaptively performing power saving in a station of a wireless communication system includes: receiving first power-save capability information from an AP, the first power-save capability information containing information on power-save schemes supported by a MAC layer of the AP; transmitting second power-save capability information to the AP in response to the first power-save capability information, the second power-save capability information containing information on power-save schemes supported by a MAC layer of the station; transmitting power-save policy information, into which properties of traffics used in the station are reflected, to the AP; and performing a power-save function while interworking with the MAC layer of the station, according to the power-save policy information based on a predetermined power-save scheme. The predetermined power-save scheme includes a common power-save scheme among the power-save schemes supported by the MAC layer of the AP and the power-save schemes supported by the MAC layer of the station.

In accordance with another embodiment of the present invention, a method for supporting adaptive power saving of a station by an AP of a wireless communication system includes: transmitting first power-save capability information to the station, the first power-save capability information containing information on power-save schemes supported by a MAC layer of the AP; receiving second power-save capability information transmitted by the station in response to the first power-save capability information, the second power-save capability information containing information on power-save schemes supported by a MAC layer of the station; receiving power-save policy information, into which properties of traffics used in the station are reflected, from the station; and performing a power-save support function for the station while interworking with the MAC layer of the AP, according to power-save support policy information based on a predetermined power-save scheme. The predetermined power-save scheme includes a common power-save scheme among the power-save schemes supported by the MAC layer of the AP and the power-save schemes supported by the MAC layer of the station, and the power-save support policy information is generated by considering the situations of necessary resources, based on the power-save policy information.

In accordance with another embodiment of the present invention, a station which adaptively performs power saving in a wireless communication system includes: a MAC layer; a receive module configured to receive first power-save capability information from an AP, the first power-save capability information containing information on power-save schemes supported by a MAC layer of the AP; a transmit module configured to transmit second power-save capability information containing information on power-save schemes supported by the MAC layer of the station and power-save policy information into which properties of traffics used in the station are reflected; and a power save coordinator (PSC) module configured to control the MAC layer and the transmit module of the station to transmit the second power-save capability information in response to the first power-save capability information and transmit the power-save policy information. The PSC module performs a power-save function while interworking with the MAC layer of the station, according to the power-save policy information based on a predetermined power-save scheme, and the predetermined power-save scheme includes a common power-save scheme among the power-save schemes supported by the MAC layer of the AP and the power-save schemes supported by the MAC layer of the station.

In accordance with another embodiment of the present invention, an access point which supports adaptive power saving of a station in a wireless communication system includes: a MAC layer; a transmit module configured to transmit first power-save capability information to the station, the first power-save capability information containing information on power-save schemes supported by the MAC layer of the AP; a receive module configured to receive second power-save capability information transmitted by the station in response to the first power-save capability information, the second power-save capability information containing information on power-save schemes supported by a MAC layer of the station, and receive power-save policy information, into which properties of traffics used in the station are reflected, from the station; and a PSC module configured to control the MAC layer and the transmit module of the AP to transmit the first power-save capability information to the station. The PSC module performs a power-save function for the station while interworking with the MAC layer of the AP, according to power-save policy information based on a predetermined power-save scheme, the predetermined power-save scheme includes a common power-save scheme among the power-save schemes supported by the MAC layer of the AP and the power-save schemes supported by the MAC layer of the station; and the power-save support policy information is generated by considering the situations of necessary resources, based on the power-save policy information.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
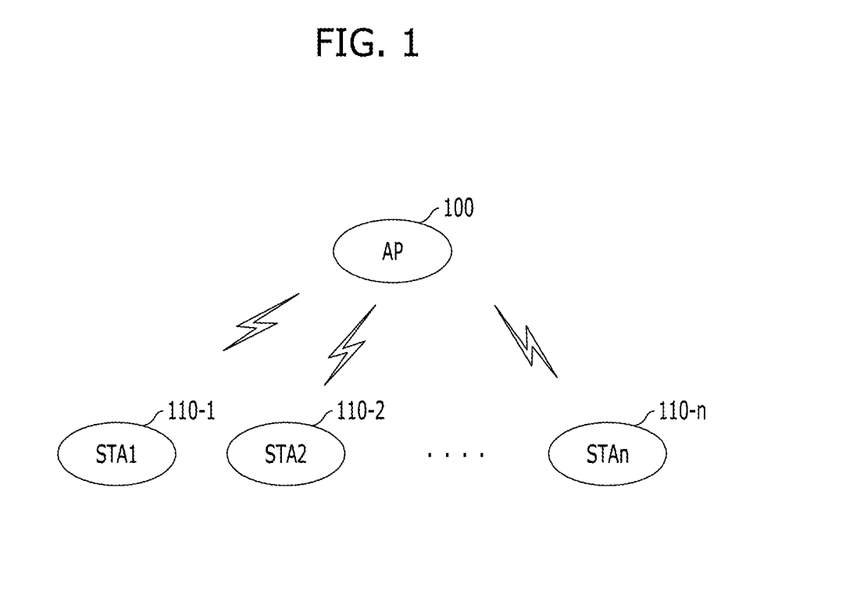
FIG. 1 is a diagram illustrating the structure of a wireless communication system.

FIG. 1 is a diagram illustrating the structure of a wireless communication system. Referring to FIG. 1, the wireless communication system to which the present invention is applied includes one base station (or AP) 100 and one or more terminals (or stations) 110-1 to 110-n. For convenience of explanation and service model proposal, terms of the IEEE 802.11 wireless LAN are used to make descriptions. Exemplary embodiments of the present invention are not limited to the terms such as AP and station.

Exemplary embodiments of the present invention disclose a power-saving method in which a variety of existing power-schemes in a media access control (MAC) layer are utilized and the situations of the AP and stations are considered and an AP and stations using the power-saving method. That is, while a variety of power-save schemes which have been already defined or are newly added are efficiently utilized, power-saving is adaptively performed in consideration of the situations of the stations and AP.

Figure 2:
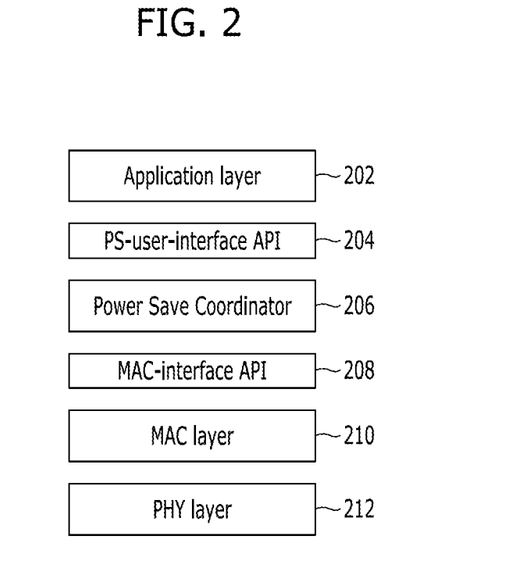
FIG. 2 is a diagram illustrating the configurations of a station and an AP in accordance with an embodiment of the present invention.

Referring to FIG. 2, the configurations of the stations and AP will be described. Each of the stations and AP includes an application layer module 202, a power save coordinator (PSC) module 206, a MAC layer module 210, and a physical layer module 212.

The application layer module 202 may provide a variety of applications for communication through the network, data reproduction/management and so on. The application layer module 202 may transfer data received from a user to the lower-layer module and transfer data received from the lower-layer module to a user, through the variety of applications. Here, the data may include various forms of data such as video data, voice data, image data, and text data.

The PSC module 206 is configured to interwork with the upper application layer module 202 through a PS-user-interface application programming interface (API) 204 and interwork with the lower MAC layer module 202 through a MAC-interface API 208 to perform the power-saving method in accordance with the embodiment of the present invention.

The MAC layer module 210 may perform power-save schemes supported in the existing MAC layer. Furthermore, the MAC layer module 210 may perform a variety of power-save schemes which are newly added. The MAC layer module of the station is configured to receive a signal from the PSC module 206 of the station, drive a variety of power-save schemes according to the received signal, and control the respective hardware modules in order for power saving.

The physical layer module 212 serves to transmit and receive actual data. That is, a transmit module in the physical layer 212 converts data received from the upper layer into an electrical signal and then transmits the converted electrical signal to a receiver side through the network, and a receive module in the physical layer 212 restores the electrical signal received from a transmitter side through the network into data, and the transfers the restored data to the upper layer.

Hereafter, operations performed by the respective modules of the station and the AP will be described below in detail.

Figure 3:
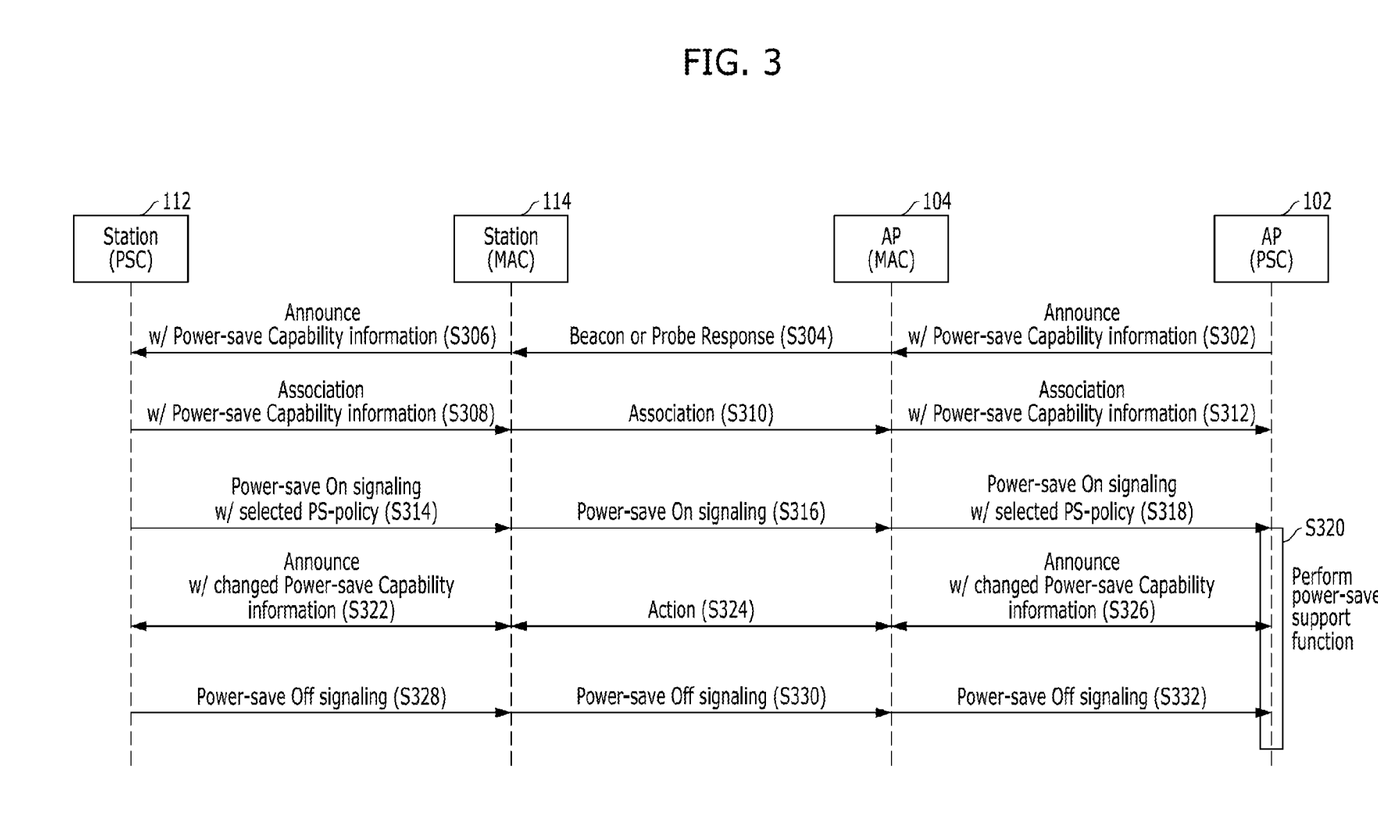
FIG. 3 is a diagram showing a power saving method in accordance with another embodiment of the present invention.

Referring to FIG. 3, the power-saving method in accordance with the embodiment of the present invention will be described. At this time, the message transmission/reception between the MAC layer module 104 of the AP and the MAC layer module 114 of the station is performed by the physical layer module of the AP and the physical layer module of the station, as described with reference to FIG. 2. Furthermore, power-save capability information of the AP, power-save capability information of the station, power-save policy information of the station, and power-save support policy information of the AP, which will be described with reference to FIG. 3, may be transmitted through an information element which is newly defined in an existing message or an available reserved field or may be transmitted through a new message.

At step S302, the PSC module 102 of the AP transmits power-save capability information of the AP to the MAC layer module 104 of the AP. For example, the power-save capability information of the AP may include information on whether the AP supports the PSC module or not and information on power-save schemes supported by the AP. The power-save capability information will be described below in detail.

At step S304, the MAC layer module 104 of the AP transmits the power-save capability information received from the PSC module 102 of the AP to the MAC layer module 114 of the station. For example, the power-save capability information of the AP may be transmitted in a state in which the power-save capability information is contained in a beacon message or probe response message used in the IEEE 802.11. Here, the beacon message refers to a message which the AP periodically broadcasts, including information required for a station which is to access the AP, and the probe response message refers to a response message to a probe request message which a station actively broadcasts to the AP, in order to search for which AP is positioned around the station.

At step S306, the MAC layer module 114 of the station transmits the power-save capability information received from the MAC layer module 104 of the AP to the PSC module 112 of the station.

At step S308, the PSC module 112 of the station transmits power-save capability information of the station to the MAC layer module 114 of the station. For example, the power-save capability information of the station may include information on whether the station supports the PSC module or not and information on power-save schemes supported by the station. The power-save capability information will be described below in detail.

At step S310, the MAC module 114 of the station transmits the power-save capability information received from the PSC module 112 of the station to the MAC layer module 104 of the AP. For example, the power-save capability information of the station may be transmitted in a state in which the power-save capability information is contained in an association-related message defined in the existing MAC. That is, the association process refers to a process in which a station having selected a proper AP through the search process accesses the AP. In order to perform the association process, the power-save capability information of the station may be contained in any one message among messages transmitted and received between the station and the AP, and then transmitted.

At step S312, the MAC layer module 104 of the AP transmits the power-save capability information received from the MAC layer module 114 of the station to the PSC module 102 of the AP.

Hereafter, the power-save capability information defined in the embodiment of the present invention will be described. The power-save capability information may include any one or more of information on whether or not to support the PSC module, information on supported power-save schemes, information on a notification period of the power-save capability information, and information on an effective period of the power-save capability information.

The power-save scheme refers to a power-save mechanism supported by the MAC layer. For example, the power-save scheme may include a legacy scheme, an automatic power save delivery (APSD) scheme, and a power save multi-poll (PSMP) scheme, which are used in the IEEE 802.11. At this time, a unique identifier may be allocated to each of the schemes, and the AP and the station may inform each other of the identifiers of power-save schemes supported thereby.

The notification period of the power-save capability information refers to a period at which one side notices the power-save capability information to the other side. The notification period may be represented by one value, for example, one day or may be represented by a predetermined range from a minimum value to a maximum value, for example, from one day to one month.

The effective period of the power-save capability information means a period during which the transmitted power-save capability information is effective. Therefore, when an apparatus receives power-save capability information of which the effective period has expired, the device does not use the power-save capability information any more. As another example, when the notification period of power-save capability information is represented by one value, the notification period may indicate the effective period of the power-save capability information.

Through the steps S302 to S312, the AP and the station come to perceive the power-save capability information of the other side. After it is confirmed that both of the AP and the station support the PSC module, the power-saving method in accordance with the embodiment of the present invention may be used. Furthermore, the AP and the station may decide which power-save scheme is to be used therebetween, based on the power-save capability information. For example, when the AP supports the legacy scheme, the APSD scheme, and the PSMP scheme and the station supports the legacy scheme and the PSMP scheme, the AP and the station may select one of the legacy scheme and the PSMP scheme by mutual consent. Furthermore, the AP and the station may prepare and manage resources required for performing the selected scheme.

At step S314 of FIG. 3, the PSC module 112 of the station decides power-save policy information of the station and transmits the decided power-save policy information to the MAC layer module 114 of the station. The power-save policy information will be described below in detail.

The MAC layer module 114 of the station transmits the power-save policy information received from the PSC module 112 of the station to the MAC layer module 104 of the AP at step S316, and the MAC layer module 104 of the AP transmits the power-save policy information received from the MAC layer module 114 of the station to the PSC module 102 of the AP at step S318. At the steps S314 to 318, the power-save policy information may be transmitted in a state in which it is contained in a power-save on signaling message noticing that the station enters the power-save mode.

Hereafter, the power-save policy information defined in the embodiments of the present invention will be described. The power-save policy information refers to information representing a policy related to power saving of the station, and may represent the power-save policy in consideration of the station's situation. Traffics used in the station have a variety of properties. For example, the application layer module 202 has a traffic property for each service. Furthermore, traffics having properties contrary to each other may exist. Therefore, the power-save policy may be represented in consideration of the properties of the traffics used in the station. The power-save policy information may be represented by using one or more of two methods which will be described below.

First, the PSC module 112 of the station classifies the station's situation into several categories depending on the properties, and may indicate the power-save policy information by using one or more of the categories. At this time, each of the categories may have a predetermined weight. For example, the PSC module 112 of the station may classify traffics used in the station into four kinds of access categories defined in the IEEE 802.11e, depending on the properties. The access categories include voice (VO), video (VI), background (BK), and best-effort (BE) categories. As examples of applications included in the respective categories, the VO category may include voice communication, the VI category may include video communication, the BK category may include e-mail, and the BE category may include web browsing. For example, when it is considered that traffic belonging to the VO categories is the most sensitive to delay and traffic belonging to the BE category is the most insensitive to delay, a highest weight may be allocated to the VO category, a second highest weight may be allocated to the VI category, a third highest weight may be allocated to the BK category, and a fourth highest weight may be allocated to the BE category. As described above, traffics having different properties may coexist in the station. For example, an Internet phone (VoIP) function belonging to the VO category and a web-browsing or data download function belonging too the BE category may be activated together in the station. In this case, the PSC module 112 of the station may indicate only the category having the highest weight in the power-save policy information. In addition, the PSC module 112 of the station may indicate only the category of traffic which is most frequently used or may indicate two or more categories together.

Second, the PSC module 112 of the station may define key factors representing the station's situations, give a weight represented by a value with a certain range to each key factor, and indicate the power-save policy information according to a variety of schemes. For example, the PSC module 112 of the station may define key factors representing the properties of traffics used in the station, and the key factors may include latency, real-timeness, high-throughput, delay, and packet error rate (PER). When a weight is give for each key factor, sensitiveness to the key factor may be reflected. Therefore, as the sensitiveness to each key factor is high, a higher weight may be given. Furthermore, the weight may be indicated as a constant value such as 3 or as a certain range, for example, a range from 2 to 4. The PSC module 112 of the station may indicate one or more of the weights for the respective key factors and the sum of the weights in the power-save policy information.

The PSC modules 112 and 206 of the station may decide such power-save policy information, compare the sum of the weights indicated in the power-save policy information with a preset threshold value, and decide whether or not to enter the power-save mode. For example, in the case in which a higher weight is given as the sensitiveness to the above-described key factors is high, the PSC modules 112 and 206 of the station may decide to enter the power-save mode, when the sum of the weights indicated in the power-save policy information is smaller than the preset threshold value. Furthermore, the power-save policy information may be stored.

According to the decided power-save policy information, the PSC modules 112 and 206 of the station interwork with the upper application layer module 202 and the lower MAC layer module 210 through the PS-user-interface API 204 and the MAC-interface API 208, respectively, and drive a specific form of power-save function in a corresponding chip solution. For example, the PCS modules 112 and 206 of the station decide a power-save level based on the power-save policy information, and transfer the power-save level information to the upper application layer module 202 and the lower MAC layer module 210. The application layer module 202 decides whether to turn on/off the respective applications and the drive levels thereof, according to the power-save level information. The MAC layer module 210 decides how to interconnect the power-save scheme of the MAC layer module 210, and decides whether to turn on or off the respective hardware modules and the drive levels thereof, according to the power-save level information. For example, the application layer module 202 decides how to interconnect the PSMP scheme, which is the currently-used power-save scheme of the MAC layer module 210, with the power-save level information, and decides to turn off hardware modules A and D and turn on only 30% of a hardware module B and 100% of a hardware module C, according to the power-save level information. Accordingly, the power-save function is performed. That is, how to interconnect the power-save level information with the power-save scheme of the MAC layer module 210 or the power-save scheme of the chip solution hardware depends on a variety of algorithms of the corresponding chip solution.

In connection with the above descriptions, when an emergency occurs so that the power of the station needs to be maintained as long as possible, the station may select a power-save policy in which the power of all the functions excluding a function related to urgent traffics may be saved, reflect the power-save policy into the station, and inform the AP of the power-save policy to adaptively deal with the emergency.

Through the steps S314 to S318, the PSC module 102 receiving the power-save policy information of the station generate power-save support policy information based on the power-save policy information of the station, and supports the power saving of the station based on the power-save support policy information at step S320. Hereafter, the power-save support policy information of the AP defined in the embodiments of the present invention and a power-save support method based on the power-save support policy information will be described.

The AP may receive the power-save policy information from the station, and determine with which power-save policy the station has entered the power-save mode. As such, the power-save policy information received from the station may be stored in the AP, or may be contained in the power-save support policy information.

The power-save support policy information is information representing policies of the AP which supports the power saving of the station, and may be managed for each station. The power-save support policy information of the AP may be indicated by using any one or more of the two methods described in the power-save policy information of the station. The data structure of the power-save support policy information may include the data structure of the above-described power-save policy information. In other words, the PSC module 102 of the AP may use categories to indicate policies supported by the AP based on the power-save policy information of the station, or indicate policies by giving a weight to each key factor. Furthermore, a maximum weight for each key factor, which may be supported by the current system, may be set in the power-save support policy information, and may be utilized as a reference value. For example, when the station sets the weight of 'delay' key factor in the power-save policy information to '3' and the AP sets the maximum weight of 'delay' key factor to '5', the AP may set the weight of 'delay' key factor in the power-save support policy information for the corresponding station to '3', because '3' is smaller than '5' which is the reference value. On the other hand, when the AP sets the maximum weight of 'delay' key factor to '2', the AP sets the weight of 'delay' key factor in the power-save support policy information for the corresponding station to '2', because '3' is larger than '2' which is the reference value, and then supports the power saving.

The PSC module 102 of the AP manages resources which are important in supporting the power saving of the station. For example, while the station is in a sleep mode after entering the power-save mode, the PSC module 102 of the AP manages a memory resource for buffering data to be transmitted to the station and notification information for noticing the station of the buffering state. The notification information may include a notification period. In addition, when a resource required for supporting the power saving of the station exists, the PSC module 102 of the AP may manage the resource. For example, the maximum weight for each key factor and/or the categories which may be supported by the current system may be set in the power-save support policy information, in consideration of the situations of resources required for supporting the power saving. As another example, information on the resources, such as a memory amount to be supported and a notification period for the buffering state, may be directly contained in the power-save support policy information.

Furthermore, the PSC module 102 of the AP may set a threshold value for each resource to be supported, and manage the resource within the AP, based on the threshold value. For example, when the memory resource of the AP is insufficient, the AP may utilize the power-save policy information and the power-save capability information of the station in the power-save mode and adaptively control the memory resource allocated to the station in the power-save mode, in consideration of whether or not it matters that the number of data (packets) to be buffered is small and whether or not it matters that the notification period for buffering is reduced.

When it is indicated that traffics insensitive to 'delay time' key factor are used, the PSC module 102 of the AP may lengthen the notification period and increase the amount of memory for buffering which is allocated to the corresponding station, by changing the power-save policy information of the station. On the other hand, when it is indicated that traffics sensitive to 'delay time' key factor are used, the PSC module 102 of the AP may shorten the notification period, reduce the notification period, and decrease the amount of memory for buffering which is allocated to the corresponding station.

Furthermore, while the AP is associated with the station through the steps S308 to S312, the PSC module 102 of the AP may control the access admission of the corresponding station in consideration of the power-save capability information of the station, the power-save capability information of the AP, and the situations of necessary resources, thereby optimizing the overload caused by the power-save support. For example, when a station supports only the APSD scheme requiring much buffering, the AP may determine that the corresponding station cannot be admitted under the condition of the current memory resource. In this case, the AP may not permit the access of the corresponding station.

In accordance with the embodiment of the present invention, when any one or more of the power-save capability information and the power-save policy information of the station is or are changed, steps S322, S324, and S326 may be performed to inform the AP of the change information. The PSC module 112 of the station transmits the changed information to the MAC layer module 114 of the station at the step S322, the MAC layer module 114 of the station transmits the changed information to the MAC layer module 104 of the AP at the step S324, and the MAC layer module 104 of the AP transmits the changed information to the PSC module 102 of the AP at the step S326. The PSC module 102 of the AP may reset any one or more of the power-save capability information and the power-save support policy information thereof by reflecting the changed information of the station including any one or more of the power-save capability information and the power-save policy information. For example, when the power-save policy needs to be changed in connection with the property of traffic occurring in the station or a different situation in which the station is placed, the power-save policy is adaptively controlled and noticed to the AP. Accordingly, it is possible to induce the power-save support of the AP which is suitable for the situation of the station.

Similarly, when any one or more of the power-save capability information and the power-save support policy information of the AP is or are changed, the steps S326, S324, and S322 may be performed to inform the station of the changed information. The PSC module 102 of the AP transmits the changed information to the MAC layer module 104 of the AP at the step S326, the MAC layer module 104 of the AP transmits the changed information to the MAC layer module 114 of the station at the step S324, and the MAC layer module 114 of the station transmits the changed information to the PSC module 112 of the station at the step S322. The PSC module 112 of the station may reset any one or more of the power-save capability information and the power-save policy information thereof by reflecting the changed information of the AP including any one or more of the power-save capability information and the power-save support policy information. For example, the PSC module 112 of the station selects a power-save policy according to the changed power-save support policy information of the AP. When the power-save support policy information of the AP does not include a power-save policy which may be selected by the PSC module 112 of the station, the station may not perform the power saving. When a selectable policy is added and is more suitable for the power state and traffic form of the station, the PSC module 112 of the station may change the power-save policy to the added policy.

As described above, the PSC module 102 of the AP may adaptively support the power saving for the station in consideration of the operation situation of the AP as well as the situation of the station. This has been left as an implementation issue in most system standards including the IEEE 802.11. Depending on the number of stations entering the power-save mode and the situations of available resources such as memory in the AP, the power-save support scheme may be adaptively changed in the middle of the power-save mode, based on the power-save capability information and the power-save policy information which have been already received from the station.

When the station is to stop the power-save function, steps S328, S330, and S332 are performed to inform the AP of the stoppage. The PSC module 112 of the station transmits a power-save off signaling message to the MAC layer module 114 of the station at the step S328, the MAC layer module 114 of the station transmits the power-save off signaling message to the MAC layer module 104 of the AP at the step S330, and the MAC layer module 104 of the AP transmits the power-save off signaling message to the PSC module 102 of the AP at the step S332. The power-save off signaling message refers to a message noticing that the station has escaped from the power-save mode. The PSC module 102 of the AP cancels the resource allocated for the power-save support for the corresponding station.

In accordance with the embodiments of the present invention, the PSC modules of the station and the AP are used to adaptively perform the power saving according to the environment of the system, by minimizing the correction of the existing MAC or without the correction. Here, as the interface between the PSC module and the MAC layer, the interface (interface/API) provided by the MAC layer of the system to be applied may be utilized. However, when MAC-related interfaces or available reserved fields are inadequate in the applied system, a new interface may be required. Since the interface is only a data structure for transferring information, hardware correction in the MAC of the applied system is not necessary. Therefore, the interface may be easily applied through the minimum firmware upgrade.

In accordance with the embodiments of the present invention, power saving may be adaptively performed while minimizing the correction for the MAC layer of the existing system. Furthermore, the AP as well as the station dynamically changes the power-save policy and the power-save support policy in consideration of current situations. Therefore, power saving may be performed adaptively for the situations. Furthermore, the embodiments of the present invention disclose the MAC-independent power saving method in which a variety of MAC-dependent power-save schemes are adaptively utilized. Therefore, a new power-save scheme may be easily applied to the existing system through a minimum function upgrade such as firmware upgrade.

While the present invention has been described with respect to the specific embodiments, it will be apparent to those skilled in the art that various changes and modifications may be made without departing from the spirit and scope of the invention as defined in the following claims.

What is claimed is:

1. A method for adaptively performing power saving in a station of a wireless communication system, comprising:

receiving first power-save capability information from an access point (AP), the first power-save capability information containing information on power-save schemes supported by a media access control (MAC) layer of the AP;

transmitting second power-save capability information to the AP in response to the first power-save capability information, the second power-save capability information containing information on power-save schemes supported by a MAC layer of the station; transmitting power-save policy information, into which properties of traffics used in the station are reflected, to the AP; and performing a power-save function while interworking with the MAC layer of the station, according to the power-save policy information based on a predetermined power-save scheme, wherein the predetermined power-save scheme comprises a common power-save scheme among the power-save schemes supported by the MAC layer of the AP and the power-save schemes supported by the MAC layer of the station, wherein the first power-save capability information further contains any one or more of information on the power-save function is performed by reflecting the changed information period at which the first power-save capability information is noticed and information on an effective period of the first power-save capability information, and wherein the second power-save capability information further contains any one or more of information on the power-save function is performed by reflecting the changed information period at which the second power-save capability information is noticed and information on an effective period of the second power-save capability information.

2. The method of claim 1, wherein the power-save schemes comprise any one or more of a legacy scheme, an automatic power save delivery (APSD) scheme, and a power save multi-poll (PSMP) scheme of the IEEE 802.11.

3. The method of claim 1, wherein the power-save policy information is transmitted in a state in which the power-save policy information is contained in a message noticing that the station enters a power-save mode.

4. The method of claim 1, wherein the power-save policy information is represented by using one or more of a method of indicating the power-save policy information by using categories into which the traffics used in the station are classified depending on the properties of the traffics and a method of indicating the power-save policy information by giving weights to key factors representing the properties of the traffics used in the station, respectively.

5. The method of claim 1, further comprising transmitting any one or more of the changed second power-save capability information and the changed power-save policy information to the AP, wherein, in said performing the power-save function while interworking with the MAC layer of the station, according to the power-save policy information based on the predetermined power-save scheme, the power-save function is performed by reflecting the changed information.

6. The method of claim 1, further comprising:

receiving any one or more of the changed first power-save capability information and changed power-save support policy information from the AP; and changing any one or more of the second power-save capability information and the power-save policy information based on the changed information received form the AP, wherein, in said performing the power-save function while interworking with the MAC layer of the station, according to the power-save policy information based on the predetermined power-save scheme, the power-save function is performed by reflecting the changed information, and the power-save support policy information comprises information generated by considering the situations of necessary resources, based on the power-save policy information, such that the AP supports power saving of the station.

7. A method for supporting adaptive power saving of a station by an AP of a wireless communication system, comprising:

transmitting first power-save capability information to the station, the first power-save capability information containing information on power-save schemes supported by a MAC layer of the AP;

receiving second power-save capability information transmitted by the station in response to the first power-save capability information, the second power-save capability information containing information on power-save schemes supported by a MAC layer of the station;

receiving power-save policy information, into which properties of traffics used in the station are reflected, from the station; and performing a power-save support function for the station while interworking with the MAC layer of the AP, according to power-save support policy information based on a predetermined power-save scheme, wherein the predetermined power-save scheme comprises a common power-save scheme among the power-save schemes supported by the MAC layer of the AP and the power-save schemes supported by the MAC layer of the station, and the power-save support policy information is generated by considering the situations of necessary resources, based on the power-save policy information.

8. The method of claim 7, wherein the power-save schemes comprise any one or more of a legacy scheme, an APSD scheme, and a PSMP scheme of the IEEE 802.11.

9. The method of claim 7, wherein the first power-save capability information further contains any one or more of information on the power-save function is performed by reflecting the changed information period at which the first power-save capability information is noticed and information on an effective period of the first power-save capability information, and the second power-save capability information further contains any one or more of information on a notification period at which the second power-save capability information is noticed and information on an effective period of the second power-save capability information.

10. The method of claim 7, wherein the power-save policy information is transmitted in a state in which the power-save policy information is contained in a message noticing that the station enters a power-save mode.

11. The method of claim 7, wherein the power-save policy information is represented by using one or more of a method of indicating the power-save policy information by using categories into which the traffics used in the station are classified depending on the properties of the traffics and a method of indicating the power-save policy information by giving weights to key factors representing the properties of the traffics used in the station, respectively, and the power-save support policy information is represented by using any one or more of a method of indicating the power-save support policy information by using categories into which traffics supported by the AP are classified depending on the properties of the traffics and a method of indicating the power-save support policy information by giving weights to key factors representing the properties of the traffics supported by the AP, respectively.

12. The method of claim 7, further comprising transmitting any one or more of the changed first power-save capability information and the changed power-save support policy information to the station, wherein, in said performing the power-save support function for the station while interworking with the MAC layer of the AP, according to the power-save support policy information based on the predetermined power-save scheme, the power-save support function is performed by reflecting the changed information.

13. The method of claim 7, further comprising:

receiving any one or more of the changed second power capability information and the changed power-save policy information from the station; and changing any one or more of the first power-save capability information and the power-save support policy information based on the changed information received form the station, wherein, in said performing the power-save support function for the station while interworking with the MAC layer of the AP, according to the power-save support policy information based on the predetermined power-save scheme, the power-save function is performed in a state in which the changed information is reflected.

14. The method of claim 7, wherein the resources comprise any one or more of a memory resource for buffering data to be transmitted to the station while the station is in a sleep mode and a notification period at which the buffering state is noticed the station.

15. A station which adaptively performs power saving in a wireless communication system, comprising:

a MAC layer module;

a receive module configured to receive first power-save capability information from an AP, the first power-save capability information containing information on power-save schemes supported by a MAC layer of the AP;

a transmit module configured to transmit second power-save capability information containing information on power-save schemes supported by the MAC layer of the station and power-save policy information into which properties of traffics used in the station are reflected; and a power save coordinator (PSC) module configured to control the MAC layer and the transmit module of the station to transmit the second power-save capability information in response to the first power-save capability information and transmit the power-save policy information, wherein the PSC module performs a power-save function while interworking with the MAC layer of the station, according to the power-save policy information based on a predetermined power-save scheme, wherein the predetermined power-save scheme comprises a common power-save scheme among the power-save schemes supported by the MAC layer of the AP and the power-save schemes supported by the MAC layer of the station, wherein the first power-save capability information further contains any one or more of information on whether the AP supports a PSC module or not, information on a notification period at which the first power-save capability information is noticed, and information on an effective period of the first power-save capability information, and wherein the second power-save capability information further contains any one or more of information on whether the station supports a PSC module or not, information on a notification period at which the second power-save capability information is noticed, and information on an effective period of the second power-save capability information.

16. The station of claim 15, wherein the power-save policy information is represented by using one or more of a method of indicating the power-save policy information by using categories into which the traffics used in the station are classified depending on the properties of the traffics and a method of indicating the power-save policy information by giving weights to key factors representing the properties of the traffics used in the station, respectively.

17. The station of claim 15, wherein the power-save schemes comprise any one or more of a legacy scheme, an APSD scheme, and a PSMP scheme of the IEEE 802.11.

18. An access point which supports adaptive power saving of a station in a wireless communication system, comprising:

a MAC layer module;

a transmit module configured to transmit first power-save capability information to the station, the first power-save capability information containing information on power-save schemes supported by the MAC layer of the AP;

a receive module configured to receive second power-save capability information transmitted by the station in response to the first power-save capability information, the second power-save capability information containing information on power-save schemes supported by a MAC layer of the station, and receive power-save policy information, into which properties of traffics used in the station are reflected, from the station; and a PSC module configured to control the MAC layer and the transmit module of the AP to transmit the first power-save capability information to the station, wherein the PSC module performs a power-save support function for the station while interworking with the MAC layer of the AP, according to power-save support policy information based on a predetermined power-save scheme, the predetermined power-save scheme comprises a common power-save scheme among the power-save schemes supported by the MAC layer of the AP and the power-save schemes supported by the MAC layer of the station; and the power-save support policy information is generated by considering the situations of necessary resources, based on the power-save policy information.

19. The access point of claim 18, wherein the power-save policy information is represented by using one or more of a method of indicating the power-save policy information by using categories into which the traffics used in the station are classified depending on the properties of the traffics and a method of indicating the power-save policy information by giving weights to key factors representing the properties of the traffics used in the station, respectively, and the power-save support policy information is represented by using any one or more of a method of indicating the power-save support policy information by using categories into which traffics supported by the AP are classified depending on the properties of the traffics and a method of indicating the power-save support policy information by giving weights to key factors representing the properties of the traffics supported by the AP, respectively.

20. The access point of claim 18, wherein the power-save schemes comprise any one or more of a legacy scheme, an APSD scheme, and a PSMP scheme of the IEEE 802.11.

* * * * *